United States Patent
Mahler et al.

(10) Patent No.: US 10,057,283 B2
(45) Date of Patent: Aug. 21, 2018

(54) VOLUMETRIC EVENT FORECASTING TOOL

(71) Applicant: Accenture Global Solutions Limited, Dublin (IE)

(72) Inventors: Paul Justin Mahler, San Francisco, CA (US); Colin Anil Puri, San Jose, CA (US)

(73) Assignee: Accenture Global Solutions Limited, Dublin (IE)

( * ) Notice: Subject to any disclaimer, the term of this patent is extended or adjusted under 35 U.S.C. 154(b) by 152 days.

(21) Appl. No.: 15/044,843

(22) Filed: Feb. 16, 2016

(65) Prior Publication Data

US 2016/0241578 A1 Aug. 18, 2016

Related U.S. Application Data

(60) Provisional application No. 62/117,252, filed on Feb. 17, 2015.

(51) Int. Cl.
*H04L 29/06* (2006.01)
*H04L 12/24* (2006.01)

(52) U.S. Cl.
CPC .......... *H04L 63/1425* (2013.01); *H04L 41/06* (2013.01); *H04L 41/142* (2013.01); *H04L 41/147* (2013.01)

(58) Field of Classification Search
CPC ............. H04L 63/1416; H04L 63/1408; H04L 63/1441; H04L 63/1458; H04L 29/06; H04L 63/1425; H04L 41/06; G06F 21/552
USPC .......................................................... 726/23
See application file for complete search history.

(56) References Cited

U.S. PATENT DOCUMENTS

| | | | | |
|---|---|---|---|---|
| 8,701,162 | B1* | 4/2014 | Pedersen ............... | G06F 21/564 370/352 |
| 9,223,969 | B2* | 12/2015 | Yoo ........................ | G06F 21/554 |
| 9,384,244 | B1* | 7/2016 | Garg ................. | G06F 17/30864 |
| 9,595,006 | B2* | 3/2017 | Dhurandhar ............. | G01D 4/00 |
| 2008/0115221 | A1 | 5/2008 | Yun et al. | |

(Continued)

OTHER PUBLICATIONS

Kim, S. et al., "Hybrid Intrusion Forecasting Framework for Early Warning System," IEICE Transactions on Information and Systems, May 2008, vol. E91-D, Issue 5, pp. 1234-1241.

(Continued)

*Primary Examiner* — Farid Homayounmehr
*Assistant Examiner* — Sanchit Sarker
(74) *Attorney, Agent, or Firm* — Fish & Richardson P.C.

(57) ABSTRACT

Methods, systems, and apparatus, including computer programs encoded on computer storage media, for forecasting event volumes. One of the methods includes receiving activity data associated with events that occur in a computer network, transforming the received activity data into processed activity data, determining, for each of a series of distinct time periods, whether the distinct time period is associated with an anomalous level of event activity, and flagging the processed activity data with a designation of whether each of the series of distinct time periods is associated with the anomalous level of event activity. Based on the flagged activity data, prediction data is generated and provided that predicts a volume of events for a given future time period and a likelihood that the volume of events for the given future time period will be anomalous.

14 Claims, 5 Drawing Sheets

(56) References Cited

U.S. PATENT DOCUMENTS

| | | | | |
|---|---|---|---|---|
| 2008/0250497 | A1* | 10/2008 | Mullarkey | H04L 41/142 726/22 |
| 2009/0126023 | A1 | 5/2009 | Yun et al. | |
| 2010/0031156 | A1* | 2/2010 | Doyle | H04L 41/142 715/736 |
| 2011/0141915 | A1* | 6/2011 | Choi | H04L 41/0631 370/242 |
| 2011/0302653 | A1* | 12/2011 | Frantz | G06F 21/552 726/22 |
| 2012/0096558 | A1* | 4/2012 | Evrard | G06F 21/577 726/25 |
| 2012/0174220 | A1* | 7/2012 | Rodriguez | H04L 63/1416 726/23 |
| 2013/0031600 | A1* | 1/2013 | Luna | G06F 21/554 726/1 |
| 2013/0318609 | A1* | 11/2013 | Kim | H04L 63/1441 726/23 |
| 2014/0082730 | A1* | 3/2014 | Vashist | H04L 63/1416 726/23 |
| 2014/0143863 | A1* | 5/2014 | Deb | G06F 21/552 726/22 |
| 2014/0258296 | A1* | 9/2014 | Chen | H04L 43/022 707/737 |
| 2015/0347750 | A1* | 12/2015 | Lietz | G06F 21/552 726/23 |
| 2016/0241578 | A1* | 8/2016 | Mahler | H04L 63/1425 |
| 2016/0371489 | A1* | 12/2016 | Puri | G06F 17/30563 |
| 2016/0373476 | A1* | 12/2016 | Dell'Anno | G06F 17/30563 |
| 2017/0032130 | A1* | 2/2017 | Durairaj | G06F 21/552 |

OTHER PUBLICATIONS

Australian Office Action in Application No. 2016201003, dated Apr. 29, 2016, 6 pages.

Alhomoud et al., "A Next-Generation Approach to Combating Botnets," Computer, Apr. 2013, 46: 62-66.

Australian Office Action for Application No. 2016201003, dated Mar. 15, 2017, 5 pages.

Australian Office Action for Application No. 2016201003, dated Apr. 24, 2017, 5 pages.

* cited by examiner

200

| Time | Likelihood |
|---|---|
| 01 Feb 2015 05:00:00 EST | 0.0023 |
| 01 Feb 2015 05:30:00 EST | 0.0028 |
| 01 Feb 2015 06:00:00 EST | 0.0026 |
| 01 Feb 2015 06:30:00 EST | 0.0033 |
| 01 Feb 2015 07:00:00 EST | 0.0036 |
| 01 Feb 2015 07:30:00 EST | 0.0043 |
| 01 Feb 2015 08:00:00 EST | 0.0064 |
| 01 Feb 2015 08:30:00 EST | 0.0079 |
| 01 Feb 2015 09:00:00 EST | 0.0082 |
| 01 Feb 2015 09:30:00 EST | 0.0085 |
| 01 Feb 2015 10:00:00 EST | 0.9323 |
| 01 Feb 2015 10:30:00 EST | 0.0095 |

FIG. 2

VOLUMETRIC EVENT FORECASTING TOOL

CROSS-REFERENCE TO RELATED APPLICATIONS

This application claims benefit of U.S. Provisional Patent Application No. 62/117,252, filed Feb. 17, 2015, and titled "VOLUMETRIC EVENT FORECASTING SYSTEM," which is hereby incorporated by reference in its entirety.

BACKGROUND

The present disclosure relates to security and network operations.

SUMMARY

In general, one innovative aspect of the subject matter described in this specification can be embodied in methods for forecasting anomalous event volumes, including receiving activity data associated with events that occur in a computer network, transforming the received activity data into processed activity data, the processed activity data including data that represents a series of distinct time periods, each distinct time period having a respective event count, determining, for each of the distinct time periods, whether the distinct time period is associated with an anomalous level of event activity, flagging the processed activity data with a designation of whether each of the series of distinct time periods is associated with the anomalous level of event activity, based on the flagged activity data, for a given future time period, generating prediction data that predicts a volume of events for the given future time period and a likelihood that the volume of events for the given future time period will be anomalous, and providing the prediction data.

Other embodiments of this aspect include corresponding computer systems, and include corresponding apparatus and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

These and other embodiments may each optionally include one or more of the following features. For instance, the received activity data can be event log data provided by an event logging system. The activity data can be received and can be transformed into processed activity data in real time as communications and systems activity occurs within the computer network. Transforming the received activity data can include maintaining an event count during a time period, and generating a record for the time period that includes the event count at the conclusion of the time period. Transforming the received activity data into processed activity data can include using a MapReduce process to collapse the received activity data into the series of distinct time periods and respective event counts. The processed activity data can be stored as records in a database. Each record can correspond to a different distinct time period, and each record can include a time period field and an event count field. Configuration data can be received that specifies a length of a time period for determining event counts. Each distinct time period of the series of distinct time periods can be of the specified length. The received activity data can be filtered by event type. Transforming the received activity data into processed activity data can include determining event counts for each distinct time period for one or more event types. Determining, for each of the distinct time periods, whether the distinct time period is associated with an anomalous level of event activity can include determining whether the event count for the distinct time period is greater than a threshold percentage of event counts for time periods under evaluation. Flagging the processed activity data with a designation of whether each of the series of distinct time periods is associated with the anomalous level of event activity can include appending a record corresponding to each distinct time period with an anomaly field, and assigning a value to the anomaly field that indicates whether the distinct time period is anomalous. Configuration data can be received that specifies a threshold level for determining whether a time period is anomalous. A schedule can be generated for launching one or more processes at future times, based on the prediction data. The schedule for launching the one or more processes can include a scheduled future time for launching a process for presenting an enhanced security interface. The schedule for launching the one or more processes can include a scheduled future time for providing additional server capacity within the computer network.

Particular embodiments of the subject matter described in this specification may be implemented so as to realize one or more of the following advantages. Spikes in general network activity can be detected, and activity data can be used to predict future system attacks. A forecast of anomalous event volumes, likelihoods, and/or periods can be provided to network administrators, thus providing warning and additional capacity to react. Large quantities of event data can be reduced to one or more lightweight data sets, thus saving data storage space and facilitating processing and analysis of the data.

The details of one or more implementations of the subject matter described in this specification are set forth in the accompanying drawings and the description below. Other potential features, aspects, and advantages of the subject matter will become apparent from the description, the drawings, and the claims.

DESCRIPTION OF DRAWINGS

FIGS. 2 & 3 depict example output in accordance with implementations of the present disclosure.

Like reference symbols in the various drawings indicate like elements.

DETAILED DESCRIPTION

This specification describes systems, methods, and computer programs for forecasting anomalous event volumes.

Figure 1:
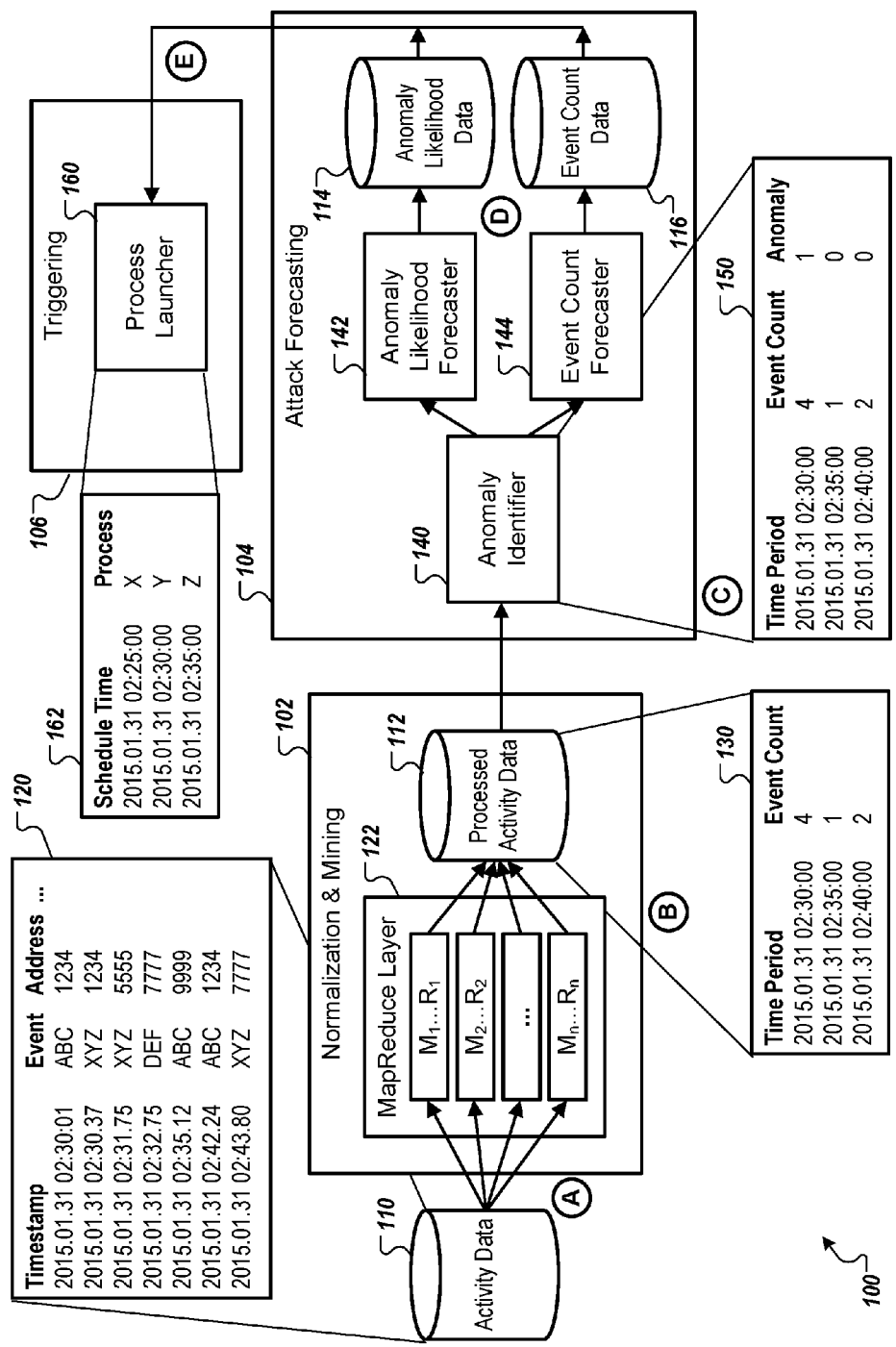
FIG. 1 depicts an example analysis and forecasting system that can execute implementations of the present disclosure.

FIG. 1 depicts an example system 100 that can execute implementations of the present disclosure. FIG. 1 also illustrates an example flow and transformation of data, shown in stages (A) to (E). Stages (A) to (E) may occur in the illustrated sequence, or they may occur in a sequence that is different than in the illustrated sequence.

As shown in FIG. 1, the example system 100 includes multiple hardware and/or software components (e.g., software modules, objects, engines, libraries, services) including a normalization and mining component 102, an attack forecasting component 104, and a triggering component 106, which can include computer instructions to perform some or all of the method steps described herein. The components 102, 104, and 106 may be implemented on the same device (e.g., same computing device), on different devices, such as devices included in a computer network, or on a special purpose computer or special purpose processor. Operations performed by each of the components 102, 104, and 106 may be performed by a single computing device, or may be distributed to multiple devices. Various data sources (e.g., databases, file systems) may maintain data used by the system 100 and its components. In the present example, the system 100 includes an activity data source 110, a processed activity data source 112, an anomaly likelihood data source 114 and an event count data source 116. In general, the system 100 and its various components (e.g., the components 102, 104, 106, and respective subcomponents) may perform functions for normalizing and mining one or more activity data sources, and forecasting attack volumes and probabilities.

Referring to the example data flow, during stage (A), the system 100 can use the normalization and mining component 102 to receive activity data 120 from the activity data source 110. In some implementations, the activity data source 110 may provide event log data. For example, the activity data 120 can be logged and provided by an event logging system associated with a computer network. Events, for example, can be atomic pieces of data associated with communications and system activity. In general, event logs may include large volumes (e.g., terabytes) of data recorded over a time period of hours, days, or weeks. In some implementations, the activity data source 110 may provide real-time event data. For example, as communications and system activity occurs within a network, corresponding events can be generated and provided to the normalization and mining component 102. In the present example, each event represented in the activity data 120 includes multiple data fields, including timestamp, event type/description, and address (e.g., Internet Protocol (IP) address) data.

During stage (B), the normalization and mining component 102 can receive and process the activity data 120. In some implementations, a MapReduce process can be used to transform activity data, collapsing the data into data that represents a series of distinct time periods and respective event counts. For example, the normalization and mining component 102 can use the MapReduce layer 122 to process the activity data 120, and to generate processed activity data 130 for storage in a database, such as the processed activity data source 112. In general, the MapReduce layer 122 may process activity data that originates from computing devices included in distributed systems, and the activity data may or may not be ordered by time. The MapReduce layer 122 can run on multiple processors, for example, each processor configured for processing data from the activity data source 110 using a parallel, distributed algorithm. In the present example, the processed activity data 130 includes time period (i.e., time bucket) and event count fields. Each record in the processed activity data 130, for example, corresponds to a different time period, and includes a count of a number of events that occurred during the time period. In the present example, a first time period (e.g., Jan. 31, 2015, 2:30:00 AM-2:34:59 AM) may be associated with an event count of four, a second time period (e.g., Jan. 31, 2015, 2:35:00 AM-2:39:59 AM) may be associated with an event count of one, and a third time period (e.g., Jan. 31, 2015, 2:40:00 AM-2:44:59 AM) may be associated with an event count of two. In general, by normalizing and mining the data, large data sets may be significantly collapsed into small data sets for storage of historical event data, upon which predictive analytics techniques may be subsequently applied.

In some implementations, real-time event data may be normalized and mined as the data is received. For example, the normalization and mining component 102 can calculate event counts for time periods as the events occur. Event counts can be maintained in computer memory during a time period, for example, and a record for the time period can be generated at the conclusion of the time period.

In some implementations, a length of a time period for performing event counts may be configurable. For example, the normalization and mining component 102 can receive configuration data from an operator, another system, and/or a system component (not shown) that specifies a time period (e.g., one minute, five minutes, fifteen minutes, a half an hour, an hour, or another suitable time period) for counting system events. In general, smaller time periods may be appropriate when a greater quantity of historical event data is available, whereas larger time periods may be appropriate when a lesser quantity of historical event data is available. For example, a system component can analyze historical event data, and can configure the length of the time period for performing event counts to be inversely proportional to the quantity of available historical event data.

In some implementations, events may be filtered. For example, the normalization and mining component 102 can filter the activity data 120 by event type (e.g., "ABC," "DEF," "XYZ") when processing the data, by calculating event counts over time periods for one or more specified event types. As another example, the normalizing and mining component can calculate event counts over time periods for all event types. In general, by considering all event types, compatibility with data collection packages may be improved.

During stage (C), the attack forecasting component 104 can receive the processed activity data 130 and can predict a volumetric forecast for total events and/or a set of probabilities for whether or not an anomalous number of events is likely to occur in a given future time period. In the present example, the attack forecasting component 104 includes an anomaly identifier component 140, an anomaly likelihood forecaster component 142, and an event count forecaster component 144. The components 140, 142, and 144 may be hardware and/or software components (e.g., software modules, objects, engines, libraries, services), and may be implemented on the same device (e.g., same computing device), or on different devices, such as devices included in a computer network. Operations performed by each of the components 140, 142, and 144 may be performed by a single computing device, or may be distributed over multiple computing devices.

Upon receiving the processed activity data 130, for example, the attack forecasting component 104 can use the anomaly identifier 140 to identify one or more time periods that correspond to an anomalous amount of event activity. In some implementations, an anomalous amount of event activity for a time period may be specified as occurring when an event count for the time period is greater than a threshold percentage of event counts for time periods within a data set (e.g., a historical event data set). For example, if the anomaly identifier 140 uses a threshold level of ninety-five percent, and data for one hundred time periods are included within the processed activity data 130, the time periods that correspond to the five largest event counts may be identified as being anomalous. In the present example, a particular time period (e.g., the time period of Jan. 31, 2015, 2:30:00 AM-2:34:59 AM) is flagged with a designation of being an anomalous time period. Flagging one or more time periods as anomalous time periods, for example, can include appending an anomaly field to records included in the processed activity data 130 and, for each time period, saving a data value (e.g., a binary value) corresponding to whether or not the time period is anomalous. In the present example, flagged activity data 150 includes a flagged record corresponding to an anomalous time period (e.g., the time period of Jan. 31, 2015, 2:30:00 AM-2:34:59 AM, where the anomaly field has a value of one) and two records corresponding to non-anomalous time periods (e.g., records where the anomaly field has a value of zero.)

In some implementations, a threshold level for determining whether a time period is designated as having an anomalous amount of event activity may be configurable. For example, the anomaly identifier 140 can receive configuration data from an operator, another system, and/or a system component (not shown) that specifies a threshold level (e.g., ninety percent, ninety-five percent, ninety-nine percent, or another suitable level) for comparing event counts for time periods and flagging anomalous time periods. In general, higher threshold levels may be appropriate when a greater quantity of historical event data is available, whereas lower threshold levels may be appropriate when a lesser quantity of historical event data is available. For example, a system component can analyze historical event data, and can configure the threshold level for determining whether a time period is designated as having an anomalous amount of event activity to correspond to the quantity of available historical event data.

In some implementations, a threshold level for determining whether a time period is designated as having an anomalous amount of activity may be applied to records within a recurring time interval. For example, when the processed activity data 130 is a small data set (e.g., less than a week), a record corresponding to a time period with an event count that meets a threshold level (e.g., a record with an event count in the top five percent of event counts) may be flagged, regardless of recurring time interval. As another example, when the processed activity data 130 is a large data set (e.g., more than a week, more than a month, or another suitable amount of time), a record corresponding to a time period with an event count that meet a threshold level for a suitable recurring time interval (e.g., records with event counts in the top five percent of event counts for a recurring time interval, such as 2:30:00-2:59:59 AM, or 2:30:00-2:59:59 AM Mondays, or another suitable time interval) may be flagged when the event count for the record meets the threshold when compared with other records associated with that recurring time interval.

In some implementations, previously flagged data may be re-flagged using updated threshold parameters and/or recurring time interval parameters. For example, updated threshold parameters and/or recurring time interval parameters may be applied by the anomaly identifier 140 by an operator and/or another system (e.g., after records are added to the processed activity data 130 or during another suitable time). Thus, time periods that are designated as having an anomalous amount of event activity may change over time, for example, and the flagged activity data 150 may be periodically refreshed.

During stage (D), the flagged activity data 150 can be received by the anomaly likelihood forecaster 142 and/or the event count forecaster 144 for further processing. The anomaly likelihood forecaster 142, for example, can use one or more statistical techniques (e.g., panel logistic regression) to analyze the flagged activity data 150 to predict the forward probability of anomalous time periods based on the time series pattern in the data 150, and can provide processed data to the anomaly likelihood data source 114, for use in providing output as described in regard to FIG. 2. The event count forecaster 144, for example, can use one or more statistical techniques (e.g., panel logistic regression) to analyze the flagged activity data 150 to forecast total event counts for future time periods based on the time series pattern in the data 150, and can provide processed data to the event count data source 116, for use in providing output as described in regard to FIG. 3.

During stage (E), the triggering component 106 can launch one or more actions based on the stored anomaly likelihood data 114 and/or event count forecast data 116. For example, the triggering component 106 can periodically analyze data stored and provided by the anomaly likelihood data source 114 and the event count data source 116. As another example, the triggering component 106 can continually monitor the data source(s) 114 and 116. As another example, the triggering component 106 can receive data directly from the anomaly likelihood forecaster 142 and the event count forecaster 144.

In general, a schedule may be generated for launching processes at future times, based on predicted periods of anomalous or high levels of network activity (e.g., high volumes of network traffic). For example, a future time period may be predicted as having an anomalously high level of network activity (e.g., the network is predicted to be subject to a Distributed Denial of Service attack (DDoS) during the time period), and one or more processes may be launched to prepare the network for an increase in activity, or to compensate for the increase. Upon determining that one or more time periods referenced in the anomaly likelihood data 114 are associated with an anomaly likelihood that meets a predetermined threshold (e.g., 90%, 95%, 99%, or another suitable value), for example, the triggering component 106 can set a schedule (e.g., schedule 162) for one or more processes to be launched at appropriate set times in the future. As another example, upon determining that one or more time periods referenced in the forecasted event count data 116 are associated with an event count that meets a particular event volume threshold, the triggering component 106 can set a schedule (e.g., schedule 162) for one or more processes to be launched at appropriate set times in the future. Appropriate set times, for example, may be during a time period, at the beginning of the time period, or an appropriate amount of time (e.g., fifteen minutes, an hour, four hours, a day, etc.) prior to the beginning of the time period. To launch a process at a scheduled time, for example, the triggering component 106 can use a process launcher component 160. Operations performed by the process launcher component 160 may be performed by a single computing device, or may be distributed over multiple computing devices.

In some implementations, launching processes may include launching one or more processes for enhancing network security. For example, based on the schedule 162 generated by the triggering component 106, the process launcher 160 can launch a process that causes an enhanced security interface (e.g., a challenge-response test) to be presented to users for logging into one or more system resources (e.g., websites, servers, or other resources). As another example, a process may be launched to block or power down one or more system resources during a particular time period. As another example, a packet filtering process may be launched, and/or one or more packet filtering rules may be modified for a particular time period.

In some implementations, launching processes may include launching one or more processes for enhancing network capacity. For example, based on the schedule 162 generated by the triggering component 106, the process launcher 160 can launch a process that causes additional server capacity (e.g., cloud capacity) to be available to a network during a particular time period, to compensate for a predicted event volume. As another example, a process may be launched to reroute network traffic during a particular time period.

In some implementations, launching processes may include launching one or more processes for providing alerts to network administrators. For example, based on the schedule 162 generated by the triggering component 106, the process launcher 160 can launch a process that sends one or more alert messages (e.g., via email, text, pager, or another suitable mechanism) in advance of a particular time period, to provide administrators with a suitable warning of predicted anomalous network activity.

FIG. 2 depicts example output 200 in accordance with implementations of the present disclosure. For example, the output 200 can be based on the anomaly likelihood data 114 (shown in FIG. 1), and can include a defined data structure. The output 200, for example, may be in a human-readable and/or machine-readable format, and may be used as input for further algorithms and/or presentation. In the present example, the output 200 (e.g., a file) includes a time-ordered series of data records stored in a particular form, each record including a field referencing a future time period value and a field referencing a likelihood value that the time period will be anomalous (e.g., the future time period will have an event count that places the time period at or above a threshold level of time periods when comparing predicted event counts among time periods). In some implementations, a likelihood value may be expressed as a number between zero and one. For instance, the time period of Feb. 1, 2015, 10:00:00 AM-Feb. 1, 2015, 10:29:59 AM in the present example is associated with a likelihood value of "0.9323", indicating that there is a ninety-three percent probability that an event volume will be experienced during the time period that is at or above a threshold level (e.g., the top ten percent, the top five percent, the top percent, or another suitable value) of event volumes per time period.

Figure 3:
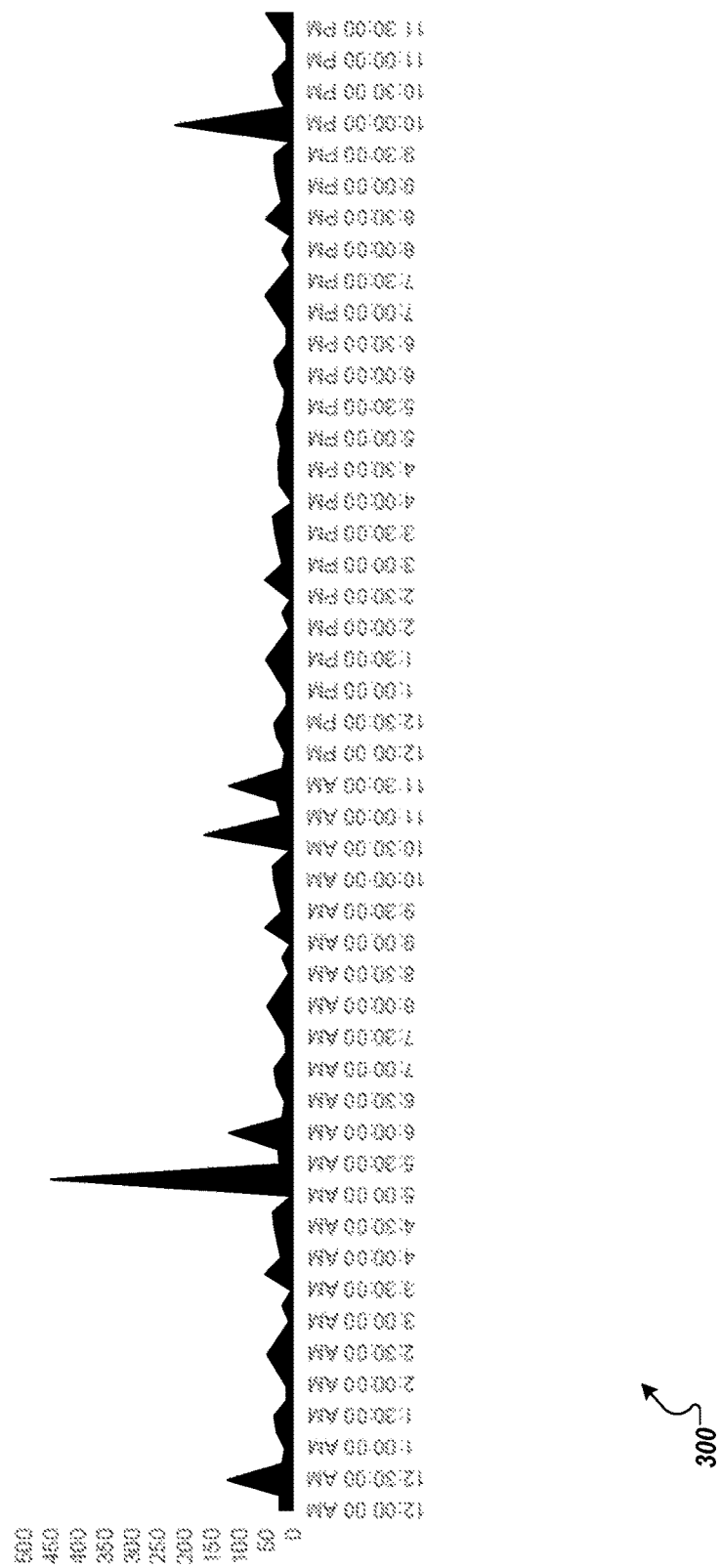

FIG. 3 depicts example output 300 in accordance with implementations of the present disclosure. For example, the output 300 can be based on the event count data 116 (shown in FIG. 1). The output 300, for example, may be in a human-readable and/or machine-readable format, and may be used as input for further algorithms and/or presentation. In the present example, the output 300 (e.g., a graph) is based on a time-ordered series of data records, with future time periods depicted along an x-axis, and predicted event counts depicted along a y-axis.

Figure 4:
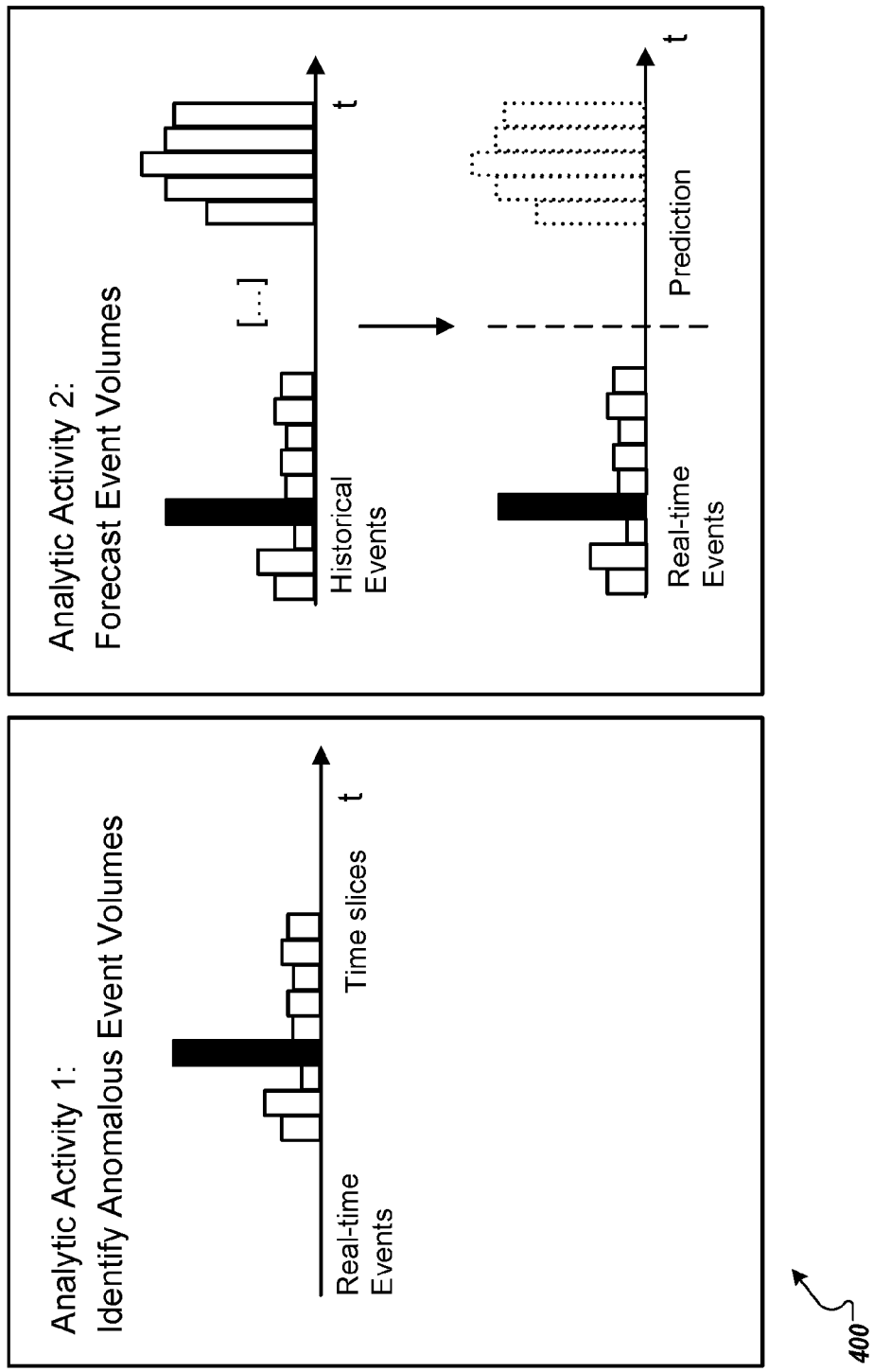
FIG. 4 depicts an example process that can be executed in accordance with implementations of the present disclosure.

FIG. 4 depicts an example process 400 that can be executed in accordance with implementations of the present disclosure. In general, the process 400 can include identifying anomalous event volumes and forecasting event volumes. Identifying anomalous event volumes, for example, can include identifying event counts for a series of time periods. The identified event counts, for example, can be based on counting events as the events occur in real-time. Forecasting event volumes (and likelihoods of anomalous time periods), for example, can include comparing the identified event counts for the series of time periods with historical event counts for a series of prior time periods to generate a series of future event count predictions. Using prior recorded information over time, for example, a computer implemented process (e.g. process 400) for forecasting event volumes can predict anomalously high periods of data flow with respect to learned history of information, by projecting time periods out into the future. In general, the closer in time that is the prediction, the more accurate the prediction may be for the future predicted event volume count. This may be performed at an aggregate level, for example, or at individual event type counts.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

Figure 5:
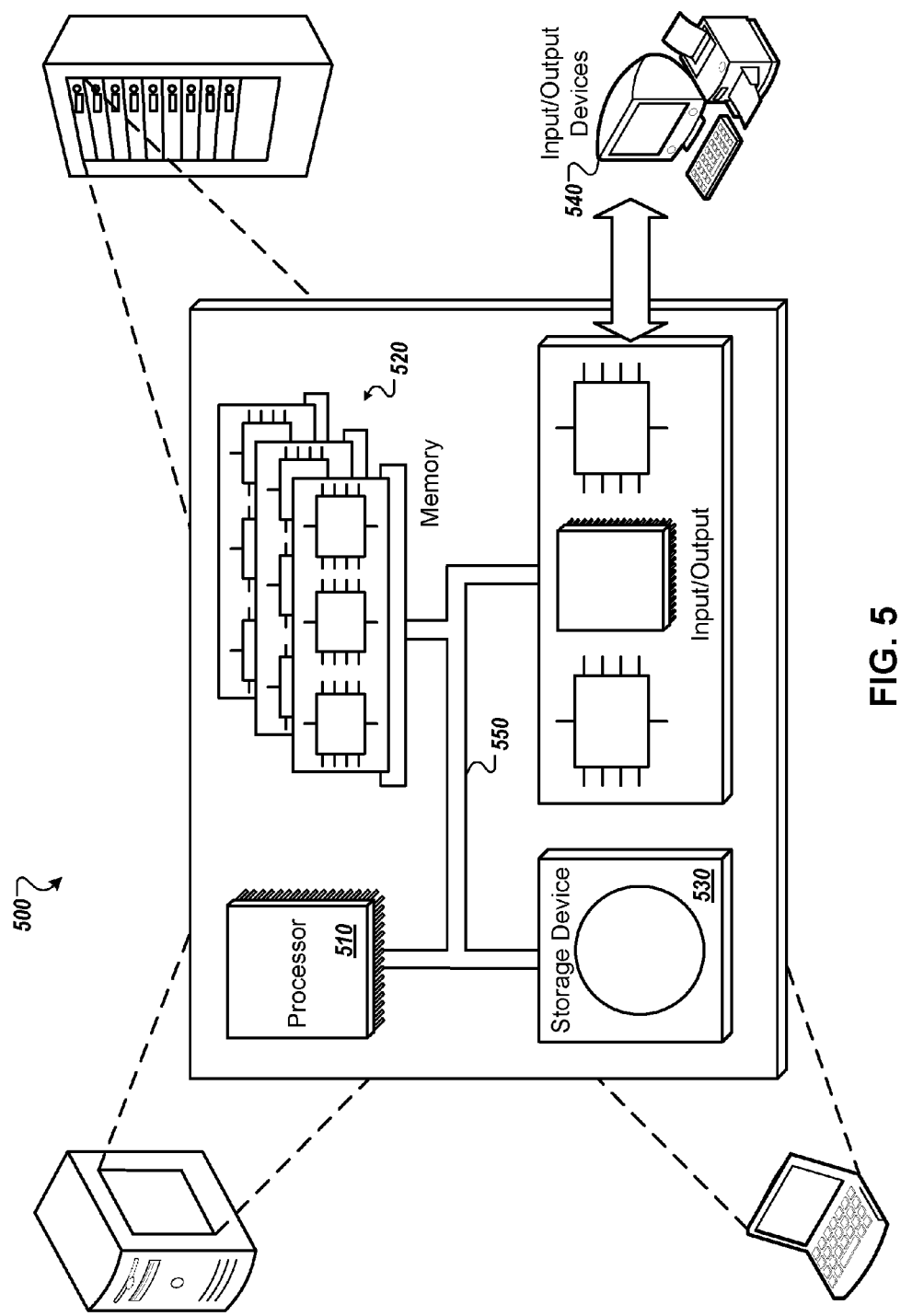
FIG. 5 is a block diagram of a computing system that can be used in connection with computer-implemented methods described in this document.

An example of one such type of computer is shown in FIG. 5, which shows a schematic diagram of a generic computer system 500. The system 500 can be used for the operations described in association with any of the computer-implement methods described previously, according to one implementation. The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for forecasting anomalous event volumes, the method comprising:
    receiving, by a normalization and mining engine of a server-based, threat detection system that includes (i) the normalization and mining engine, (ii), an attack forecasting engine, and (iii) a triggering engine, activity data associated with events that occur in a computer network, the events including communications and system activity;
    transforming, by the normalization and mining engine of the threat detection system, the received activity data into processed activity data, the processed activity data including data that represents a series of distinct time periods, each distinct time period having a respective event count;
    determining, by the attack forecasting engine of the threat detection system and for each of the distinct time periods, whether the distinct time period is associated with an anomalous level of event activity, including determining whether the event count for the distinct time period is greater than a threshold percentage of event counts for time periods under evaluation;
    flagging, by the attack forecasting engine of the threat detection system, one or more time periods of the series of distinct time periods with a designation of whether the one or more time periods is associated with the anomalous level of event activity;
    identifying, by the attack forecasting engine of the threat detection system, a time series pattern in data representing the one or more flagged time periods;
    generating, by the attack forecasting engine of the threat detection system and based on the time series pattern, prediction data that forecasts total event counts for each of one or more future time periods and a likelihood that the forecasted total event counts for each of the one or more future time periods will be anomalous, the forecasted total event count including communications and system activity; and
    generating, by the triggering engine of the threat detection system, a schedule for launching one or more processes in the one or more future time periods based on the prediction data, the processes including at least one or more of:
        a process for blocking or powering down one or more system resources in the computer network,
        a packet filtering process,
        a process for providing additional server capacity within the computer network, or
        a process for rerouting network traffic; and
    scheduling, by the triggering engine of the threat detection system, the one or more processes to launch in the one or more future time periods in accordance with the schedule.

2. The computer-implemented method of claim 1, wherein the received activity data is event log data provided by an event logging system.

3. The computer-implemented method of claim 1, wherein the activity data is received and is transformed into processed activity data in real time as communications and system activity occur within the computer network, wherein transforming the received activity data includes maintaining an event count during a time period, and generating a record for the time period that includes the event count at the conclusion of the time period.

4. The computer-implemented method of claim 1, wherein transforming the received activity data into processed activity data includes using a MapReduce process to collapse the received activity data into the series of distinct time periods and respective event counts.

5. The computer-implemented method of claim 1, further comprising storing the processed activity data as records in a database, wherein each record corresponds to a different distinct time period, and wherein each record includes a time period field and an event count field.

6. The computer-implemented method of claim 1, further comprising receiving configuration data that specifies a length of a time period for determining event counts, wherein each distinct time period of the series of distinct time periods is of the specified length.

7. The computer-implemented method of claim 1, further comprising filtering the received activity data by event type, wherein transforming the received activity data into processed activity data includes determining the event count for each distinct time period for one or more event types.

8. The computer-implemented method of claim 1, wherein flagging the one or more time periods with a designation of whether each of the series of distinct time periods is associated with the anomalous level of event activity includes appending a record corresponding to each distinct time period with an anomaly field, and assigning a value to the anomaly field that indicates whether the distinct time period is anomalous.

9. The computer-implemented method of claim 1, further comprising receiving configuration data that specifies a threshold level for determining whether a time period is anomalous.

10. The computer-implemented method of claim 1, wherein the schedule for launching the one or more processes includes a scheduled future time for launching a process for presenting an enhanced security interface.

11. A non-transitory computer-readable storage medium coupled to one or more processors and having instructions stored thereon which, when executed by the one or more processors, cause the one or more processors to perform operations comprising:
    receiving, by a normalization and mining engine of a server-based, threat detection system that includes (i)

the normalization and mining engine, (ii), an attack forecasting engine, and (iii) a triggering engine, activity data associated with events that occur in a computer network, the events including communications and system activity;

transforming, by the normalization and mining engine of the threat detection system, the received activity data into processed activity data, the processed activity data including data that represents a series of distinct time periods, each distinct time period having a respective event count;

determining, by the attack forecasting engine of the threat detection system and for each of the distinct time periods, whether the distinct time period is associated with an anomalous level of event activity, including determining whether the event count for the distinct time period is greater than a threshold percentage of event counts for time periods under evaluation;

flagging, by the attack forecasting engine of the threat detection system, one or more time periods of the series of distinct time periods with a designation of whether the one or more time periods is associated with the anomalous level of event activity;

identifying, by the attack forecasting engine of the threat detection system, a time series pattern in data representing the one or more flagged time periods;

generating, by the attack forecasting engine of the threat detection system and based on the time series pattern, prediction data that forecasts total event counts for each of one or more future time periods and a likelihood that the forecasted total event counts for each of the one or more future time periods will be anomalous, the forecasted total event count including communications and system activity; and generating, by the triggering engine of the threat detection system, a schedule for launching one or more processes in the one or more future time periods based on the prediction data, the processes including at least one or more of:
a process for blocking or powering down one or more system resources in the computer network,
a packet filtering process,
a process for providing additional server capacity within the computer network, or
a process for rerouting network traffic; and scheduling, by the triggering engine of the threat detection system, the one or more processes to launch in the one or more future time periods in accordance with the schedule.

12. The non-transitory computer-readable storage medium of claim 11, wherein transforming the received activity data into processed activity data includes using a MapReduce process to collapse the received activity data into the series of distinct time periods and respective event counts.

13. The non-transitory computer-readable storage medium of claim 11, the operations further comprising storing the processed activity data as records in a database, wherein each record corresponds to a different distinct time period, and wherein each record includes a time period field and an event count field.

14. A computing system including (i) a normalization and mining engine, (ii) an attack forecasting engine, and (iii) a triggering engine, the system comprising:
one or more processors; and
one or more computer-readable devices including instructions that, when executed by the one or more processors, cause performance of operations including:
receiving, by the normalization and mining engine, activity data associated with events that occur in a computer network, the events including communications and system activity;
transforming, by the normalization and mining engine, the received activity data into processed activity data, the processed activity data including data that represents a series of distinct time periods, each distinct time period having a respective event count;
determining, by the attack forecasting engine and for each of the distinct time periods, whether the distinct time period is associated with an anomalous level of event activity, including determining whether the event count for the distinct time period is greater than a threshold percentage of event counts for time periods under evaluation;
flagging, by the attack forecasting engine, one or more time periods of the series of distinct time periods with a designation of whether the one or more time periods is associated with the anomalous level of event activity;
identifying, by the attack forecasting engine of the threat detection system, a time series pattern in data representing the one or more flagged time periods;
generating, by the attack forecasting engine of the threat detection system and based on the time series pattern, prediction data that forecasts total event counts for each of one or more future time periods and a likelihood that the forecasted total event counts for each of the one or more future time periods will be anomalous, the forecasted total event count including communications and system activity; and
generating, by the triggering engine, a schedule for launching one or more processes in the one or more future time periods based on the prediction data, the processes including at least one or more of:
a process for blocking or powering down one or more system resources in the computer network,
a packet filtering process,
a process for providing additional server capacity within the computer network, or a process for rerouting network traffic; and
scheduling, by the triggering engine, the one or more processes to launch in the one or more future time periods in accordance with the schedule.

* * * * *

UNITED STATES PATENT AND TRADEMARK OFFICE
CERTIFICATE OF CORRECTION

PATENT NO. : 10,057,283 B2  
APPLICATION NO. : 15/044843  
DATED : August 21, 2018  
INVENTOR(S) : Paul Justin Mahler and Colin Anil Puri Page 1 of 1

It is certified that error appears in the above-identified patent and that said Letters Patent is hereby corrected as shown below:

In the Claims

Column 11, Line 32, Claim 1, delete "(ii)," and insert -- (ii) --, therefor.

Column 13, Line 1, Claim 11, delete "(ii)," and insert -- (ii) --, therefor.

Signed and Sealed this  
Twenty-fifth Day of September, 2018

Andrei Iancu  
*Director of the United States Patent and Trademark Office*